United States Patent
Oms

(10) Patent No.: US 11,807,384 B2
(45) Date of Patent: Nov. 7, 2023

(54) RESIDUAL CURRENT DEVICE FOR PROTECTING A DC-VOLTAGE ELECTRICAL INSTALLATION

(71) Applicant: Airbus Operations SAS, Toulouse (FR)

(72) Inventor: Patrick Oms, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/488,469

(22) Filed: Sep. 29, 2021

(65) Prior Publication Data

US 2022/0106056 A1    Apr. 7, 2022

(30) Foreign Application Priority Data

Oct. 2, 2020    (FR) ........................................ 2010075

(51) Int. Cl.
*H02H 3/00*    (2006.01)
*B64D 41/00*    (2006.01)
*H02H 1/04*    (2006.01)
*H02H 3/33*    (2006.01)

(52) U.S. Cl.
CPC .............. *B64D 41/00* (2013.01); *H02H 1/04* (2013.01); *H02H 3/33* (2013.01)

(58) Field of Classification Search
CPC ............. H02H 3/32; H02H 3/33; B64D 41/00
USPC .................................................. 361/91.1, 94
See application file for complete search history.

(56) References Cited

U.S. PATENT DOCUMENTS

| 4,783,713 A * | 11/1988 | Chen ........................ H02H 3/46 361/48 |
| 5,856,902 A * | 1/1999 | Hashimoto ............... H02H 3/33 361/57 |
| 6,392,422 B1 * | 5/2002 | Kammer .................. H02H 1/06 324/509 |
| 6,542,345 B1 | 4/2003 | Bauer |
| 2004/0145841 A1 | 7/2004 | Lambardin et al. |
| 2007/0063961 A1 * | 3/2007 | Kuroki ................. G09G 3/3413 345/102 |
| 2008/0174928 A1 * | 7/2008 | Liu .......................... H02H 6/00 361/93.1 |
| 2010/0194354 A1 | 8/2010 | Gotou et al. |

OTHER PUBLICATIONS

French Search Report; priority document.

* cited by examiner

*Primary Examiner* — Jared Fureman
*Assistant Examiner* — Lucy M Thomas
(74) *Attorney, Agent, or Firm* — Greer, Burns & Crain, Ltd.

(57) ABSTRACT

A device includes a current difference measurement module for measuring the difference between a current flowing in a positive contact of the electrical installation and a current flowing in a negative contact of the electrical installation, a low-pass filter for filtering the differential current, a full-wave rectifier without threshold module for rectifying the filtered current and a trip module for emitting a trip command when the rectified current is greater than or equal to a predetermined threshold for a predetermined duration. The device thus makes it possible to protect a DC-voltage electrical installation in a noisy environment.

8 Claims, 3 Drawing Sheets

RESIDUAL CURRENT DEVICE FOR PROTECTING A DC-VOLTAGE ELECTRICAL INSTALLATION

CROSS-REFERENCES TO RELATED APPLICATIONS

This application claims the benefit of the French patent application No. 2010075 filed on Oct. 2, 2020, the entire disclosures of which are incorporated herein by way of reference.

FIELD OF THE INVENTION

The present invention relates to the protection of DC-voltage electrical installations. It relates, in particular, to a residual current device for protecting a DC-voltage electrical installation.

BACKGROUND OF THE INVENTION

In an electrical installation, an electric current arriving via one contact of the electrical installation and then flowing through one or more conductors has to exit via another contact of the electrical installation. Thus, if a current at one contact of the electrical installation is different from the current at another contact of the electrical installation, this means that a current leakage is present. Now, this current leakage may be hazardous for an item of equipment connected to the electrical installation or for an operator manipulating the electrical installation. To overcome this problem, residual current devices are already known. These residual current devices make it possible to protect electrical installations and the operator by detecting residual currents. When a residual current is detected, these devices emit a command signal called a trip signal. This tripping then commands a disconnection circuit with a circuit breaker, which then disconnects any power supply to the electrical installation.

However, these residual current devices do not exist for DC-voltage electrical installations in an environment subject to strong electromagnetic interference.

SUMMARY OF THE INVENTION

The present invention aims to overcome this deficiency by proposing a residual current device for protecting a DC-voltage electrical installation.

To this end, the invention relates to a residual current device for protecting a DC-voltage electrical installation, the installation comprising a positive contact and a negative contact.

According to the invention, the device comprises at least:
a current difference measurement module configured so as to produce a voltage corresponding to a differential current that corresponds to a current difference between the current flowing in the positive contact and the current flowing in the negative contact;
a low-pass filter configured so as to filter the differential current and emit a filtered current;
a full-wave rectifier without threshold module configured so as to produce a voltage corresponding to a rectified current that corresponds to the filtered current rectified by the full-wave rectifier without threshold module;
a trip module configured so as to emit a trip command when the rectified current is greater than or equal to a predetermined threshold for a predetermined duration.

Thus, by virtue of the device, it is possible to protect DC-voltage electrical installations from residual currents.

According to the invention, the function of the low-pass filter is that of guaranteeing justified tripping of the residual current device in the event of detection of a DC current leakage, even if the environment is very noisy, and not of preventing potential unwanted tripping caused by interference.

The full-wave rectifier without threshold module, moreover, comprises a plurality of operational amplifiers, a plurality of resistors and a plurality of diodes.

The trip module furthermore comprises:
a comparator submodule configured so as to emit a signal representative of the result of a comparison between the rectified current and the predetermined threshold;
a counter submodule configured so as to emit a confirmation signal confirming whether the signal representative of the result of the comparison indicates that the rectified current is greater than or equal to the predetermined threshold for a duration greater than or equal to the predetermined duration;
a flip-flop submodule configured so as to emit the trip command when the counter submodule emits the confirmation signal.

The comparator submodule additionally comprises a comparator having an inverting input configured so as to receive a signal representative of the predetermined threshold, a non-inverting input connected to the rectifier module and configured so as to receive the rectified current, and an output configured so as to emit the signal representative of the result of the comparison.

The counter submodule furthermore comprises an inverter and a counter, the inverter having an output and an input connected to the output of the comparator and configured so as to receive the signal representative of the result of the comparison, the counter having a reset-to-zero input connected to the output of the inverter, a clock input configured so as to receive a clock signal and an output configured so as to emit the confirmation signal.

According to one particular feature, the flip-flop submodule comprises a D flip-flop, the D flip-flop having a clock input connected to the output of the counter and configured so as to receive the confirmation signal, a reset-to-zero input configured so as to receive a reset signal representative of resetting of the D flip-flop, a data input configured so as to receive a signal complementary to the signal representative of the trip command and an output configured so as to emit the trip command signal.

The invention also relates to a DC-voltage electrical installation comprising a residual current device as specified above for protecting the DC-voltage electrical installation.

The invention also relates to an aircraft comprising a DC-voltage electrical installation as specified above.

BRIEF DESCRIPTION OF THE DRAWINGS

The invention, along with its features and advantages, will become more clearly apparent upon reading the description, given with reference to the appended drawings, in which.

DETAILED DESCRIPTION OF THE PREFERRED EMBODIMENTS

Figure 1:
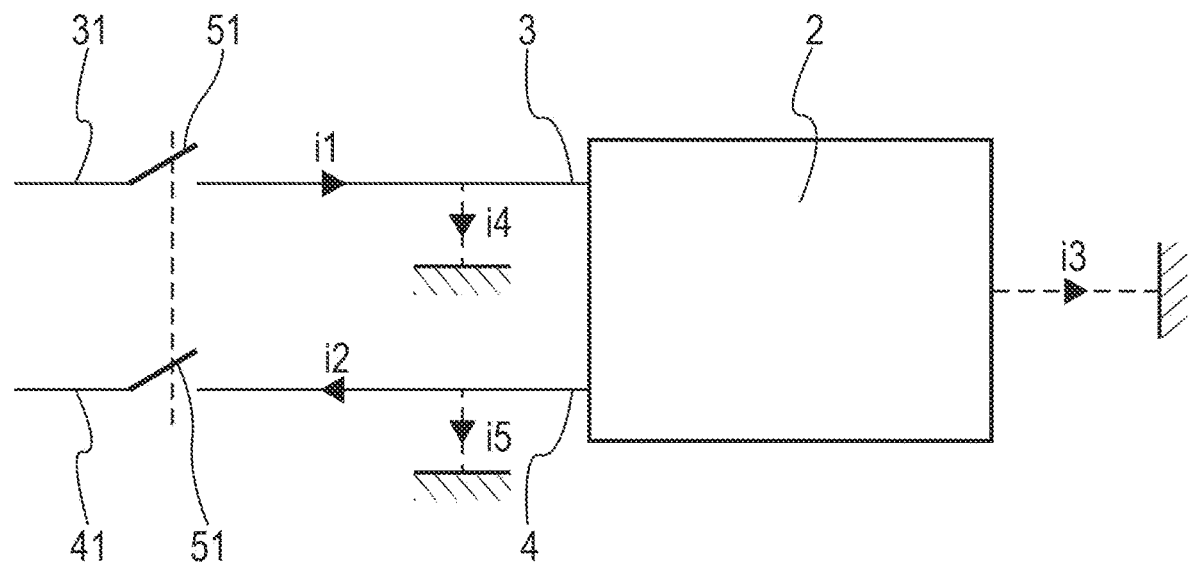
FIG. 1 shows a schematic view of a DC-voltage electrical installation, illustrating one embodiment of the invention, and the leakage currents that may occur.
Figure 2:
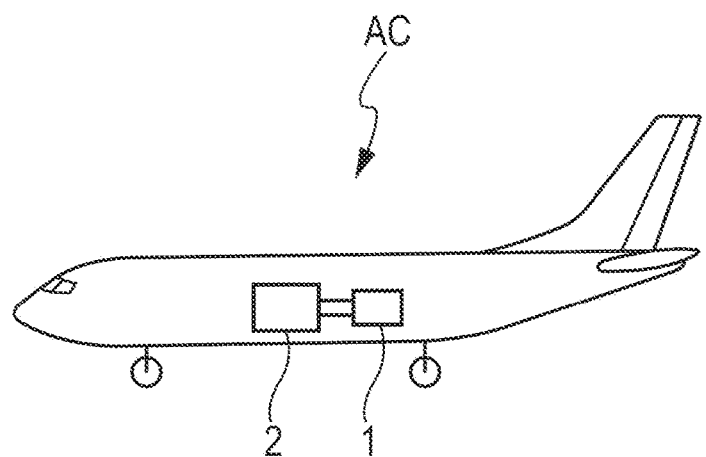
FIG. 2 shows a profile view of an aircraft housing a DC-voltage electrical installation and a residual current device, illustrating one embodiment of the invention.
Figure 3:
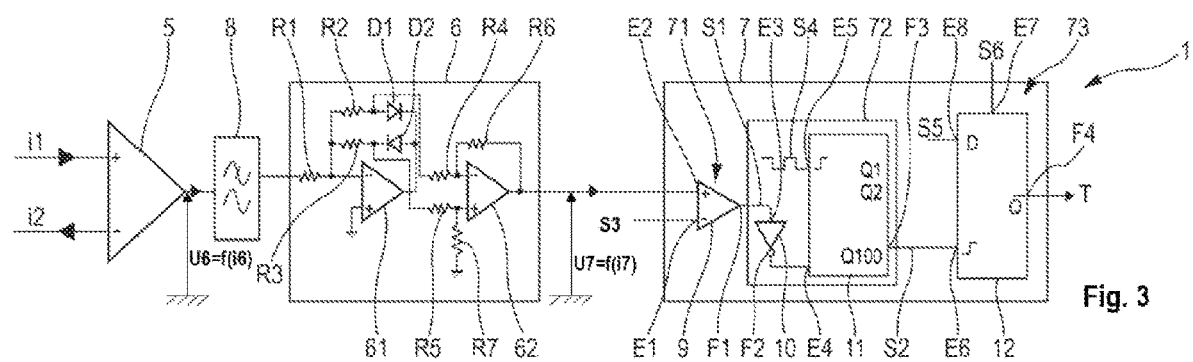
FIG. 3 shows a circuit diagram of the residual current device, illustrating one embodiment of the invention.

FIG. 3 shows one embodiment of the residual current device 1 for protecting a DC-voltage electrical installation 2 shown in FIG. 1. In the remainder of the description, the residual current device is called "device 1".

The electrical installation 2 may be housed on board an aircraft AC, in particular a transport plane.

As shown in FIG. 1, the electrical installation 2 comprises a positive contact 3 and a negative contact 4. The positive contact may be connected to a conductor 31 of positive polarity in order to supply current i1 to the electrical installation 2 from a supply circuit. The negative contact may be connected to a conductor 41 of negative polarity, allowing the current i2 to return to the supply circuit. As shown in FIG. 1, current leakages may occur: a leakage current i4 from the conductor 31 of positive polarity, a leakage current i5 from the conductor 41 of negative polarity and a leakage current i3 in the electrical installation 2.

According to Kirchhoff's node law, the sum of the currents arriving at a node is equal to the sum of the currents leaving the node. Therefore, the difference between the current i1 and the current i2 is equal to the sum of the leakage currents i3, i4 and i5. If the difference between the current i1 and the current i2 is not zero, there are one or more leakage currents. If this difference reaches a certain threshold, the electrical installation 2 is disconnected from the supply circuit in order to protect the electrical installation 2. FIG. 1 shows the electrical installation 2 disconnected from the supply circuit by switches 51 that are open for each of the conductors 31 and 41. The switches 51 are, for example, contained in a circuit breaker. The device 1 thus makes it possible to protect the electrical installation 2.

As shown in FIG. 3, the device 1 comprises a current difference measurement module 5, a full-wave rectifier without threshold module 6 and a trip module 7.

The current difference module 5 is configured so as to produce a voltage U6 that corresponds to a differential current i6 corresponding to the absolute value of the current difference between the current i1 flowing in the positive contact 3 and the current i2 flowing in the negative contact 4. In FIG. 3, U6=f(i6) signifies that the voltage U6 depends on the differential current i6.

The device 1 furthermore comprises a low-pass filter 8 configured so as to filter the differential current i6 before it is rectified by the full-wave rectifier without threshold module 6.

The order of the low-pass filter 8, its cutoff frequency and its damping factor may be defined such that the low-pass filter complies with two conditions.

The first condition is based on knowledge of the spectrum of the normal earth-fault currents in an electrical network. The low-pass filter is dimensioned so as to obtain a peak differential current, after filtering, that is smaller than the offset between the minimum current hazardous to humans and the detection threshold (predetermined threshold). In other words, the low-pass filter is configured such that a peak differential current, after filtering, is less than or equal to the difference between the minimum current hazardous to humans and the predetermined threshold. This makes it possible to avoid having to reset a counter 11 of the trip module 7 to zero before the end of the predetermined duration, as caused by low peaks of a noisy signal.

For example, the minimum current hazardous to humans is equal to 90 mA, and the detection threshold is chosen to be equal to 70 mA. The offset is therefore equal to 20 mA for this example.

The second condition is based on the fact that the addition of the response time of the filter to respond to a current hazardous to humans and the confirmation time should not exceed the predetermined duration for disconnecting the electrical installation 2 from the supply circuit. In other words, the sum of the response period of the filter for responding to a current hazardous to humans and the confirmation period for this response period is less than or equal to the predetermined duration for disconnecting the electrical installation 2 from the supply circuit.

For example, the response time is equal to 5 ms and the predetermined duration is equal to 150 ms. The confirmation time is therefore equal to 145 ms.

In the example presented above, the chosen low-pass filter 8 complying with the two conditions is thus a second-order low-pass filter having a cutoff frequency of 100 Hz and a damping factor of 0.7.

Figure 6:
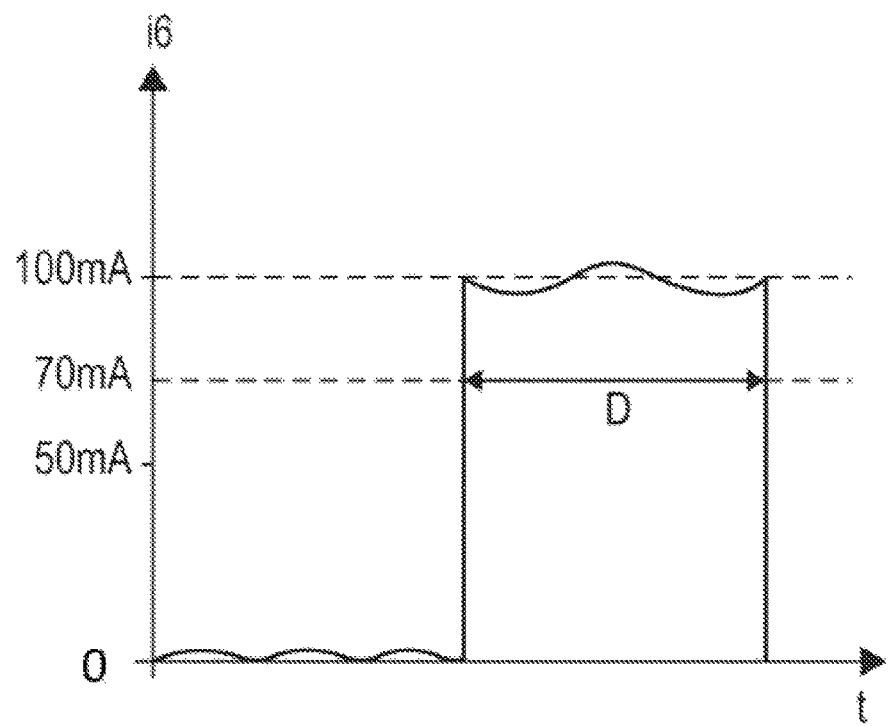
FIG. 6 shows a curve displaying one example of the evolution of the differential current over time after having been filtered by the low-pass filter when a fault occurs.

FIG. 6 shows a curve displaying one example of the evolution of the differential current i6 after filtering by the low-pass filter 8. The predetermined threshold is set at 70 mA. Low peaks are smoothed and remain greater than the predetermined threshold, but do not reset the counter 11 to zero if the time D for which these peaks are greater than the predetermined threshold is less than the predetermined duration, thereby stopping the emission of a trip command T by a D flip-flop 12 of the trip module 7. If the time D is greater than or equal to the predetermined duration, a trip command T may be emitted. This thus makes it possible to detect leakage currents that were not able to be detected without filtering.

The full-wave rectifier without threshold module 6 is configured so as to produce a voltage U7 that is an image of the rectified current i7 corresponding to the filtered differential current rectified by the full-wave rectifier without threshold module 6. In FIG. 3, U7=f(i7) signifies that the voltage U7 depends on the rectified current i7.

The trip module 7 is configured so as to emit a trip command T when the rectified current i7 is greater than or equal to a predetermined threshold for a predetermined duration.

The predetermined threshold and the predetermined duration have values that allow sufficient protection so that current leakages are not hazardous to humans.

In general, the minimum current that might be hazardous to humans is equal to 90 mA for an exposure duration of 150 ms.

According to a first non-limiting example, a predetermined threshold is equal to 150 mA and the predetermined duration is equal to 70 ms.

According to a second non-limiting example, a predetermined threshold is equal to 70 mA and the predetermined duration is equal to 150 ms.

This trip command T may be transmitted to a circuit breaker, which will disconnect the electrical installation 2 from the supply circuit when it has received the trip command T.

The full-wave rectifier without threshold module 6 may comprise two operational amplifiers 61 and 62, seven resistors R1, R2, R3, R4, R5, R6 and R7 and two diodes D1 and D2. This full-wave rectifier without threshold module 6 may be formed by a half-wave rectifier comprising the operational amplifier 61, the diodes D1 and D2 and the resistors R1, R2 and R3 and by an inverse adder comprising the operational amplifier 62 and the resistors R4, R5, R6 and R7.

Figure 4:
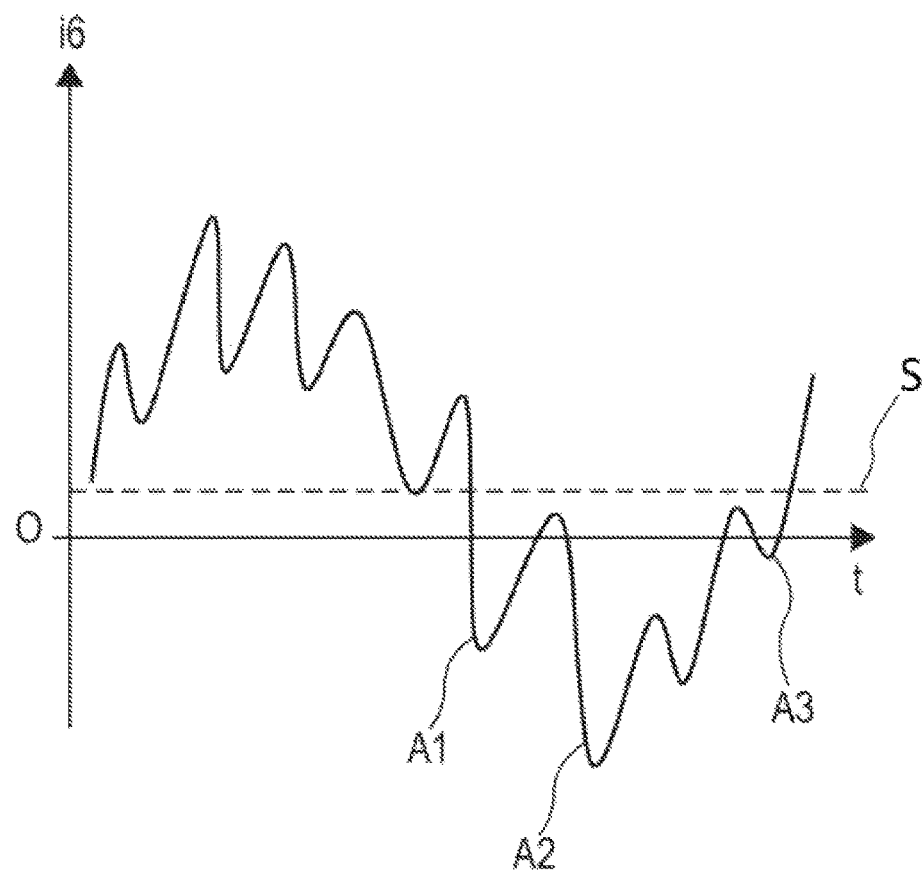
FIG. 4 shows a curve displaying one example of the evolution of the differential current over time in the absence of a fault.
Figure 5:
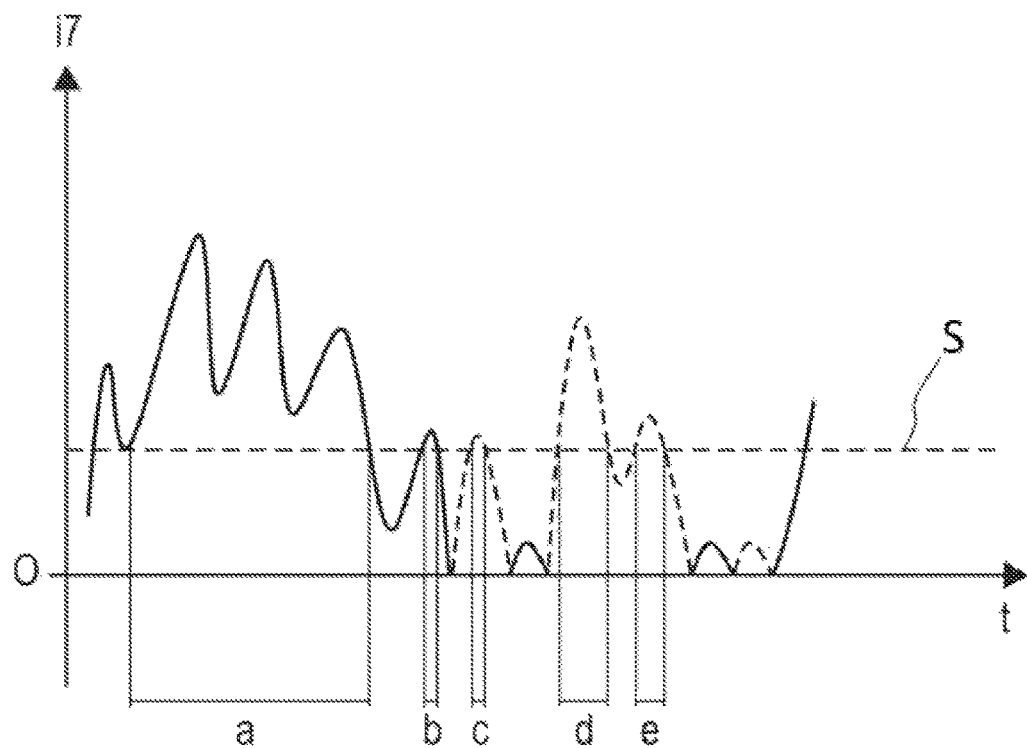
FIG. 5 shows a curve displaying one example of the evolution of the rectified current over time, the rectified current corresponding to the differential current from FIG. 4.

FIG. 4 shows one example of the evolution of a differential current i6 as a function of time t. FIG. 5 shows the rectified current i7 corresponding to the filtered differential current rectified by the full-wave rectifier without threshold module 6. As shown in these figures, the full-wave rectifier without threshold module 6 makes it possible to rectify the negative half-waves A1, A2, A3 of the differential current i6. FIG. 5 shows, in curved dashed lines, the rectified negative half-waves A1, A2, A3 shown in FIG. 4. The horizontal dashed line S represents the predetermined threshold.

The letters a, b, c, d and e in FIG. 5 represent the durations for which the rectified current i7 is greater than or equal to the predetermined threshold. If one of these durations a, b, c, d or e is greater than or equal to the predetermined duration, a trip command T is emitted by the trip module 7.

As shown in FIG. 3, the trip module 7 may comprise a comparator submodule 71, a counter submodule 72 and a flip-flop submodule 73.

The comparator submodule 71 is configured so as to emit a signal S1 representative of the result of a comparison between the rectified current i7 and the predetermined threshold.

The comparator submodule 71 may comprise a comparator 9 having an inverting input E1, a non-inverting input E2 connected to the rectifier module 6 and an output F1. The voltage U7, which corresponds to an image of the rectified current i7, is intended to be applied to the non-inverting input E2. A signal S3 representative of the predetermined threshold is intended to be applied to the inverting input E1. The signal S1 representative of the result of the comparison is intended to be emitted by the output F1 of the comparator 9.

The counter submodule 72 is configured so as to emit a confirmation signal S2 confirming whether the signal S1 representative of the result of the comparison indicates that the voltage U7 is greater than or equal to the predetermined threshold for a duration greater than or equal to the predetermined duration.

The counter submodule 72 may comprise an inverter 10 and a counter 11. The inverter 10 has an output F2 and an input E3 connected to the output F1 of the comparator 9. The counter 11 has a reset-to-zero input E4 connected to the output F2 of the inverter 10, a clock input E5 and an output F3. The output F2 of the inverter 10 is connected to the reset-to-zero input E4 of the counter 11. The signal S1 representative of the result of the comparison is intended to be applied to the input E3 of the inverter 10. A clock signal S4 is intended to be applied to the clock input E5 of the counter 11. The confirmation signal S2 is intended to be emitted by the output F3 of the counter 11.

Without limitation, the clock signal has a clock cycle that lasts 1 ms.

The flip-flop submodule 73 is configured so as to emit the trip command T when the counter submodule 72 emits the confirmation signal S2.

The flip-flop submodule 73 may comprise a D flip-flop 12. This D flip-flop 12 has a clock input E6 connected to the output F3 of the counter 11, a reset-to-zero input E7, a data input E8 and an output F4. The confirmation signal S2 is intended to be applied to the clock input E6 of the D flip-flop 12. The trip command signal T is intended to be emitted at the output F4 of the D flip-flop 12. A signal S5 complementary to the signal representative of the trip command T is intended to be applied to the data input E8 of the D flip-flop 12. A reset signal S6 representative of resetting of the D flip-flop 12 is intended to be applied to the reset-to-zero input E7 of the D flip-flop 12. The reset signal S6 may be applied by an operator in order to reset the D flip-flop 12 to zero after this D flip-flop 12 has emitted a trip command signal T.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A residual current device for protecting a DC-voltage electrical installation, the installation comprising a positive contact and a negative contact,
    wherein the device comprises:
    a current difference measurement module configured to produce a voltage corresponding to a differential current that corresponds to a current difference between a current flowing in the positive contact and a current flowing in the negative contact;
    a low-pass filter directly connected to the current difference measurement module and configured to filter the differential current and emit a filtered current, wherein the low-pass filter is configured to apply two conditions to filter the differential current and wherein one of the two conditions is based on a response time of the device to respond to a current hazardous to humans, and wherein the other of the two conditions is based on a peak differential current, after filtering, of a difference between a minimum current hazardous to humans and a predetermined threshold;
    a full-wave rectifier without threshold module configured to produce a voltage corresponding to a rectified current that corresponds to the filtered current rectified by the full-wave rectifier without threshold module; and
    a trip module configured to emit a trip command when the rectified current is greater than or equal to the predetermined threshold for a predetermined duration.

2. The residual current device as claimed in claim 1, wherein the full-wave rectifier without threshold module comprises a plurality of operational amplifiers, a plurality of resistors and a plurality of diodes.

3. The residual current device as claimed in claim 1, wherein the trip module comprises:

a comparator submodule configured to emit a signal representative of a result of a comparison between the rectified current and the predetermined threshold;

a counter submodule configured to emit a confirmation signal confirming whether the signal representative of the result of the comparison indicates that the rectified current is greater than or equal to the predetermined threshold for a duration greater than or equal to the predetermined duration; and a flip-flop submodule configured to emit the trip command when the counter submodule emits the confirmation signal.

4. The residual current device as claimed in claim 3, wherein the comparator submodule comprises
a comparator having an inverting input configured to receive a signal representative of the predetermined threshold,
a non-inverting input connected to the full-wave rectifier without threshold module and configured to receive the rectified current, and
an output configured to emit the signal representative of a result of the comparison.

5. The residual current device as claimed in claim 4, wherein the counter submodule comprises an inverter and a counter, the inverter having an output and an input connected to the output of the comparator and configured to receive the signal representative of the result of the comparison, the counter having a reset-to-zero input connected to the output of the inverter, a clock input configured to receive a clock signal and an output configured to emit the confirmation signal.

6. The residual current device as claimed in claim 5, wherein the flip-flop submodule comprises a D flip-flop, the D flip-flop having a clock input connected to the output of the counter and configured to receive the confirmation signal, a reset-to-zero input configured to receive a reset signal representative of resetting of the D flip-flop, a data input configured to receive a signal complementary to the signal representative of the trip command and an output configured so as to emit the trip command signal.

7. A DC-voltage electrical installation, wherein said installation comprises a residual current device as claimed in claim 1 for protecting said installation.

8. An aircraft comprising an electrical installation as claimed in claim 7.

* * * * *